INVENTORS
P. M. YAVORSKY
E. GORIN

INVENTORS
P.M. YAVORSKY
E. GORIN

United States Patent Office 3,584,042
Patented June 8, 1971

3,584,042
CONVERSION OF THIOSULFATE TO FORMATE
Paul M. Yavorsky, Monongahela, and Everett Gorin, Pittsburgh, Pa., assignors to Consolidation Coal Company, Pittsburgh, Pa.
Continuation-in-part of application Ser. No. 667,479, Sept. 13, 1967. This application Nov. 24, 1969, Ser. No. 879,224
Int. Cl. C01d 7/00; C07c 53/06
U.S. Cl. 260—542                 4 Claims

ABSTRACT OF THE DISCLOSURE

Sodium, potassium and ammonium thiosulfates may be converted to the corresponding formates by first reducing the thiosulfates with the corresponding formates at elevated temperatures to form the corresponding carbonates, and thereafter reducing the carbonates to formates, respectively, by a reducing agent containing CO.

CROSS-REFERENCES TO RELATED APPLICATIONS

This application is a continuation-in-part of application Ser. No. 667,479, filed Sept. 13, 1967, now Pat. No. 3,475,326. Other related applications, filed of even date herewith, describing and claiming certain subjects matter hereinafter disclosed in connection with the invention of the present application are an application filed by N. J. Mazzocco, E. Gorin and P. M. Yavorsky entitled "Regeneration of Formate from Thiosulfate," and application filed by E. Gorin and P. M. Yavorsky entitled "Desulfurization of Flue Gas."

BACKGROUND OF THE INVENTION

(1) Field of the Invention

The present invention generally relates to the removal of sulfur dioxide from gases by reaction with potassium formate, sodium formate, or ammonium formate and, more particularly, to the regeneration of the formate that is consumed in the reaction.

(2) Description of the prior art

In copending applications Ser. No. 667,479 and the application filed by E. Gorin and P. M. Yavorsky entitled "Desulfurization of Flue Gas" referred to above, there is described a process for removing sulfur dioxide from hot flue gas which comprises reacting the sulfur dioxide with potassium formate, sodium formate or ammonium formate in a liquid state (i.e. in solution or in molten form). The principal product of the reaction is the corresponding thiosulfate, as shown by the following equation:

(1)     $2MCOOH + 2SO_2 = M_2S_2O_3 + 2CO_2 = H_2O$ where M is Na, K, or $NH_4$.

The thiosulfates are useful per se, or as intermediates. However, it is generally preferred to regenerate formate from the thiosulfate, for reuse in the absorption of sulfur dioxide.

SUMMARY OF THE INVENTION

In accordance with the present invention, a process is provided for converting potassium thiosulfate, sodium thiosulfate, or amonium thiosulfate to the corresponding formate, which may then be reused in the absorption of sulfur dioxide from flue gas. The process of the present invention comprises conversion of the thiosulfate to the corresponding carbonate and $H_2S$, and conversion of the carbonate to the desired formate.

The conversion of the thiosulfate to carbonate and $H_2S$ may be expressed by the following principal reaction:

(2)     $M_2S_2O_3 + 4COOH = 3M_2CO + 2H_2S + CO_2$ where M is Na, K, or $NH_4$.

The reaction expressed by Equation 2 is actually a simplified expression of two sequential conversions, namely, the conversion of the thiosulfate to sulfides, followed by the conversion of the sulfides to $H_2S$. The conversion to sulfides may be illustrated by the following equations:

(2a)    $4MCOOH + M_2S_2O_3 = 4MHCO_3 + 2MSH$ (2b)
$4MCOOH + M_2S_2O_3 = M_2CO_3 + 2M_2S + 3CO_2 + H_2O$

The conversion of the sulfides to $H_2S$ may be illustrated by the following equation:

(2c)    $MSH + CO_2 + H_2O = MHCO_3 + H_2S$ (2d)    $M_2S + CO_2 + H_2O = M_2CO_3 + H_2S$

The $MHCO_3$ produced in Equations 2a and 2c is also converted to carbonate by reaction with MSH, thusly:

(2e)    $MHCO_3 + MSH = M_2CO_3 + H_2S$

The conversion of the thiosulfate to carbonate and $H_2S$ may be accomplished as will be shown later, either in one vessel under conditions favoring Reaction (2) or in two vessels under conditions favoring, in the one vessel, Reactions (2a) and (2b) and, in the other vessel, Reactions (2c), (2d), and (2e). Reaction (2) becomes rapid at temperatures between 450 and 700° F., but preferably the temperature is maintained between 500 and 700° F. The pressure should be between 200 and 3000 p.s.i.g., preferably 500 p.s.i.g.

The conversion of the carbonate to formate is effected by reduction of the carbonate by carbon monoxide with or without hydrogen present. Without hydrogen, but with water present, the reaction may be expressed by the following equation:

(3a)    $M_2CO_3 + 2CO + H_2O = 2MCOOH + CO_2$

With hydrogen present, and in the substantial absence of water, the reaction is as follows:

(3b)    $M_2CO_3 + CO + H_2 = 2MCOOH$

Reaction (3a) is substantially non-catalytic and proceeds at temperatures as low as 300° F. The upper temperature limit is imposed only by the necessity of avoiding decomposition of the formate. The preferred temperature range is 475 to 550° F. Reaction (3b) is catalytic at low temperature, but generally does not require a catalyst at high temperature, the overall temperature range being 300 to 800° F., but preferably 500 to 600° F. with catalyst and 600 to 700° F. with no catalyst. Suitable catalysts include the transition group metals and sulfides and the Group VI metal sulfides. The metals and metal sulfides may be used directly or on a suitable catalyst support. The pressure in Reactions (3a) and (3b) should be between 200 and 2000 p.s.i.g., preferably above 500 p.s.i.g.

The rate of thermal decomposition of the formate, i.e. the reverse of Reaction (3), increases with temperature, and it is, of course, desirable to minimize this reaction. This may be done by applying sufficient partial pressure of CO and $H_2$ to prevent reversal of Reaction (3). We have found that the application of pressures of CO and $H_2$ as a function of temperature as shown in Table I below TABLE I
[Equilibrium pressures of CO and $H^2$]

| Temperature, °F | 600 | 635 | 670 | 700 |
|---|---|---|---|---|
| CO plus $H^2$ pressure (p.s.i.a.) | 435 | 650 | 890 | 1,230 | is sufficient to prevent decomposition of the formate. In general, satisfactory rates are obtained if the total pressure of CO and $H_2$ exceeds the equilibrium pressure by about 1000 p.s.i.g.

Excess formate which is not consumed by the $SO_2$ absorption (Equation 1) is used in Reaction (2) after removal of the scrubbing product from flue gas contact. A fraction of the $M_2S$ formed in Reaction (2b) is converted to $H_2S$ and $M_2CO_3$ by the action of $CO_2$ and steam (Reaction [2d]) which are liberated in Reaction (2b). The $M_2S$ may be completely converted to $M_2CO_3$ by conventional techniques by using additional quantities of $CO_2$ and steam. The $H_2S$ can be converted to elemental sulfur by existing industrial processes, for example, the Claus process.

Some typical results obtained from laboratory experiments are reported below in Tables II and III for the conversion of thiosulfate to formate in a molten system as distinguished from an aqueous system. In this regeneration, the conversion of thiosulfate to formate was studied as two stages, namely, Stage 1, the conversion of thiosulfate to carbonate and $H_2S$; and Stage 2, the conversion of carbonate to formate. Table II below pertains to Stage 1 and Table III pertains to Stage 2.

(approximately 85% residual formate, 15% sulfur compounds) was heated in a sealed autoclave to 635° F. A pressure of 1300 p.s.i.g. developed after again pressuring to 1650 p.s.i.g. with a 50/50 $CO_2/H_2$ mixture. The data show that three-fourths of the sulfur compounds in the actual scrubbing product was reduced, forming $H_2S$ and $K_2S$. If the $H_2S$ had been removed, essentially all of the sulfur compounds in the actual used scrubbing product would have been converted to $H_2S$ in this manner.

It is clear that, at temperatures needed to reduce thiosulfate by formate (>450° F., preferably about 500–700° F.), elevated pressures are needed. Addition of CO and $H_2$ in 1:1 molar ratios is preferred to maintain elevated pressures. Experiments have shown that the application of CO and $H_2$ pressure reduces the amount of formate decomposed. Thus, the use of CO in $H_2$ for pressurizing the Stage 1 regeneration is the preferred procedure. This gas blend, under pressure, reverses formate decomposition as discussed above.

One of the primary end products of the Stage 1 regeneration is carbonate. Accordingly, the reaction (4) $\quad K_2CO_3 + H_2 + CO = 2\ KCOOH$ was studied experimentally. The pertinent data for Stage 2 are shown in Table III below.

TABLE II.—REGENERATION STAGE 1

[Conversion of sulfur products to sulfides and attendant carbonate by reduction with molten KCOOH]

| Run No. | Starting material | Temp. (°F.) | Pressure (p.s.i.g.) | Time (min.) | Original sulfur distribution, percent in— | | | | | Sulfur distribution in products,[1] percent in— | | | | |
|---|---|---|---|---|---|---|---|---|---|---|---|---|---|---|
| | | | | | $K_2S_2O_3$ | $K_2S$ | $H_2S$ | $K_2SO_4$ | $K_2SO_3$ | $K_2S_2O_3$ | $K_2S$ | $H_2S$ | $K_2SO_4$ | $K_2SO_3$ and others |
| 1 | 17% $K_2S_2O_3$ in KCOOH | 475 | 0 | 240 | 100 | 0 | 0 | 0 | 0 | 2.4 | 39.8 | 19.1 | 1.4 | 37.2 |
| 2 | 25% $K_2S_2O_3$ in KCOOH | 635 | [2] 1,525 | 120 | 100 | 0 | 0 | 0 | 0 | 7.5 | 46.7 | 42.4 | 2.5 | 0.9 |
| 3 | Actual scrub product [3] | 635 | [2] 1,300 | 120 | 79.8 | 15.1 | 0 | 5.1 | 0 | 26.7 | 30.1 | 42.7 | 0.5 | 0 |
| 4 | 10% $K_2S_2O_3$ in KCOOH | 540 | [4] 260 | 120 | 100 | 0 | 0 | 0 | 0 | 3.3 | 67.4 | 26.9 | 0.6 | 1.7 |
| 5 | 20% $K_2S_2O_3$ in KCOOH | 600 | [4] 470 | 120 | 100 | 0 | 0 | 0 | 0 | 1.3 | 70.1 | 26.3 | 0.8 | 1.5 |
| 6 | 50% $K_2S_2O_3$ in KCOOH | 670 | [4] 2,730 | 120 | 100 | 0 | 0 | 0 | 0 | 4.7 | 69.4 | 21.0 | 3.0 | 1.9 |

[1] Balance of potassium is present as $K_2CO_3$ and KCOOH.
[2] Under $CO_2$ and $H_2$ pressure.
[3] Formed by reaction of $SO_2$ with molten potassium formate at 350° F.
[4] Under CO and $H_2$ pressure.

The yield of carbonate for each of the runs reported in Table II was found to be in stoichiometric relation to the amount of thiosulfate converted. The set of data obtained in Run No. 1 was at atmospheric pressure. The data showed that thiosulfate is almost completely reduced by formate to yield predominantly potassium sulfide and hydrogen sulfide. Without a closed system able to retain pressure, a higher temperature cannot be used; the reaction becomes violent with rapid evolution of $H_2S$ and other products of decomposition. In the sets of data for Runs 2 and 3 for a closed system at 635° F., a reducing gas consisting of equimolar amounts of $CO_2/H_2$ was applied. Analysis of the products showed, however, little or no consumption of the reducing gas. The thiosulfate was substantially all reduced to mostly hydrogen sulfide and potassium sulfides. An equilibrium is involved in Reaction (2d) which explains why incomplete conversion of $K_2S$ to $H_2S$ is observed. In practice, continuous supply of $CO_2$ and removal of $H_2S$ from the reaction site will lead to complete conversion of the $K_2S$ intermediate to $H_2S$.

The proven reducibility of thiosulfate with formate demonstrated that the actual scrubbing product from the absorption of $SO_2$ by KCOOH could be reduced by formate. The results of such an experiment are shown in the data for Run 3 in Table II. The actual Scrub Product

TABLE III.—REGENERATION STAGE 2

Conversion of Carbonate to Formate at 635° F.

Feed charge=25% $K_2CO_3$ in molten KCOOH
Equimolar $CO/H_2$ used to pressurize stirred autoclave containing molten charge

| | Total pressure (p.s.i.g.) | Reaction time (min.) | Percent of $K_2CO_3$ converted to KCOOH |
|---|---|---|---|
| Run No.: | | | |
| 1 | 2,500 | 120 | 95.0 |
| 2 | 2,500 | 60 | 90.3 |
| 3 | 2,500 | 30 | 36.7 |
| 4 | 1,750 | 120 | 90.7 |
| 5 | 1,750 | 60 | 72.2 |
| 6 | 1,750 | 30 | 21.6 |
| 7 | 1,000 | 120 | 36.0 |
| 8 | 1,000 | 60 | 22.3 |
| 9 | 1,000 | 30 | 11.0 |

The data show that better than 90% of the carbonate can be converted to formate at 635° F. by applying $CO/H_2$ pressure of 2500 p.s.i.g. for one hour, or 1750 p.s.i.g. for two hours. Even better reaction rates would be obtained with modern industrial gas-liquid contactors for such reactions. Laboratory experiments have also demonstrated that this regeneration reaction proceeds, though more slowly, at the lower temperature of 600° F. Also, the reaction rate is increased severalfold by raising the temperature from 635 to 670° F. At temperatures below 600° F., e.g. 500° F. at 1500 p.s.i.g., 73% conversion of potassium carbonate to formate was obtained in a nonaqueous system by means of a copper catalyst consisting essentially of the metal copper supported on alumina.

The conditions and results of runs pertaining to the conversion of potassium thiosulfate to potassium formate in an aqueous system, as distinguished from a molten system, are reported in Tables IV, V and VI, below. In this study of regeneration of formate from thiosulfate, the conversion was conducted in three steps, namely, (1) conversion of thiosulfate to sulfides, (2) conversion of sulfides to $H_2S$, and (3) the conversion of the attendant carbonate from (1) and (2) to formate by reaction with CO. Tables IV, V and VI relate, respectively, to these three conversion steps.

TABLE IV

[Continuous reduction of aqueous spent formate to provide sulfur in sulfide form]

|  | For simulated spent formate | For actual spent formate |
|---|---|---|
| Run conditions: |  |  |
| Temperature, °F | 540 | 540 |
| Pressure, p.s.i.g | 500 | 500 |
| Stirrer speed, r.p.m | 825 | 825 |
| Solution feed rate, gm./hr | 4,140 | 4,370 |
| Reactor inventory, gm | 1,070 | 1,120 |
| Reaction residence time, min | 15 | 15 |
| Feed Analysis, wt. percent: |  |  |
| $K_2S_2O_3$ | 24.0 | 20.23 |
| KCOOH | 56.0 | 52.13 |
| $H_2O$ | 20.0 | 22.06 |
| S as $K_2S_2O_3$ | 8.09 | 6.82 |
| S as $K_2SO_3$ | 0 | 0.19 |
| S as KHS | 0 | 0.32 |
| S as $K_2SO_4$ | 0 | 0.73 |
| Product solution analysis, wt. percent: |  |  |
| $K_2S_2O_3$ | 1.42 | 0.50 |
| $K_2CO_3$ | 42.01 | 42.43 |
| $KHCO_3$ | 10.68 | 5.04 |
| S as $K_2S_2O_3$ | 0.48 | 0.17 |
| S as $K_2SO_3$ | 0.22 | 0.09 |
| S as KHS | 5.77 | 5.80 |
| S as $K_2SO_4$ | 0.19 | 0 |
| Product gas analysis, vol. percent: |  |  |
| $H_2S$ | 34.40 | 37.51 |
| $CO_2$ | 64.50 | 61.77 |
| CO | 0.10 | 0.30 |
| $H_2$ | 1.00 | 0.42 |

TABLE V

Stripping $H_2S$ from KHS in Typical Reduced Product Solution by $CO_2$ at 200° F.
$CO_2$ rate=8 s.c.f./hr. per kgm. of Solution
Feed analysis.—15.28% KHS, 36.7% $K_2CO_3$ equivalent[1] 48.35% $H_2O$
Product analysis.—0.00% KHS, remainder as $K_2CO_3$ and $KHCO_3$

[Off-gas analysis]

| Run time, min. | $H_2S$, vol. percent | $CO_2$, vol. percent |
|---|---|---|
| 5 | 25.19 | 74.81 |
| 10 | 22.11 | 77.89 |
| 20 | 17.94 | 82.06 |
| 40 | 15.14 | 84.86 |
| 60 | 9.96 | 90.04 |
| 90 | 5.00 | 95.00 |
| 120 | 2.01 | 97.99 |
| 150 | 0.00 | 100.00 |

[1] Some carbonate exists as bicarbonate and more so as $CO_2$ is added

TABLE VI

Typical continuous KCOOH regeneration by CO reduction of aqueous $K_2CO_3$, using 4 ft. high by 2.63 in. ID stirred reactor Conditions:
 Temperature—536° F.
 Total pressure—1190 p.s.i.g.
 CO partial pressure—700 p.s.i.a.
 $K_2CO_3$ concentration in feed solution—60%
 Feed solution feed rate—2570 gm./hr.
 Feed fas—Pure CO
 CO feed rate—28.5 s.c.f./hr.
 Stirrer speed—1200 r.p.m.
 Reaction residence time—108 min.

Results:
 KCOOH production rate—1695 gm./hr.
 Synthesis conversion—90.3%
 $CO_2$ in off-gas—35.9%
 CO in off-gas—61.0%
 $H_2$ in off-gas—3.1%

DESCRIPTION OF DRAWINGS

For a better understanding of our invention, its objects and advantages, reference should be had to the accompanying drawings in which.

Description of regeneration in a molten formate system

Figure 1:
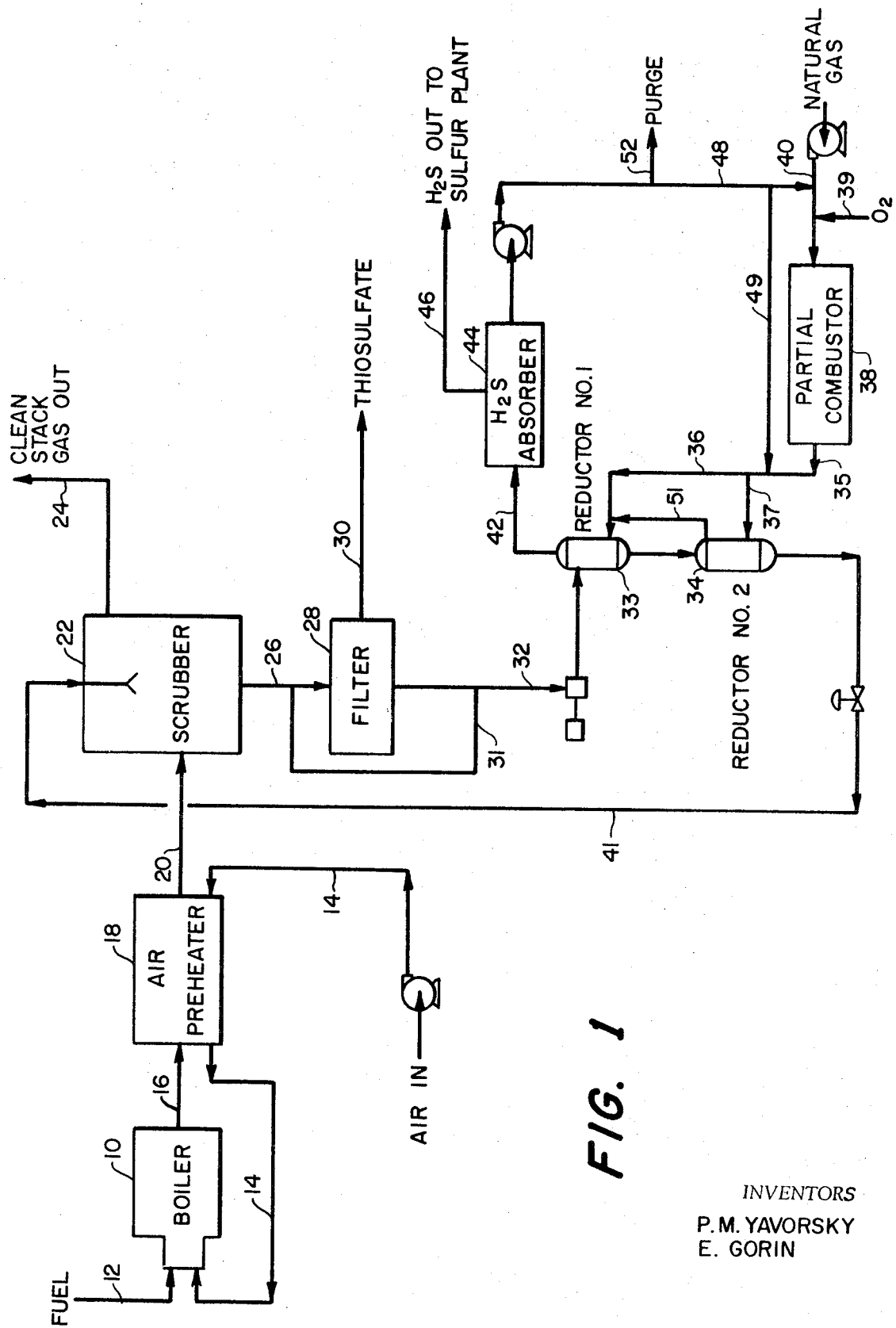
FIG. 1 is a schematic flowsheet of our process for regenerating molten formate from thiosulfate.

Referring to FIG. 1 of the drawings, numeral 10 designates any conventional steam boiler heated by the combustion of a sulfur-containing fuel, e.g. coal, introduced through a conduit 12 with air introduced through a pipe 14. Hot flue gas containing $SO_2$ is conducted by a pipe 16 to an air preheater 18 for heat exchange with the incoming air carried by the pipe 14. The flue gas is then passed through a pipe 20 to a scrubber 22 for removal of $SO_2$, in a manner to be more fully described below. The resulting flue gas of reduced or zero $SO_2$ content is discharged through a stack 24.

The scrubber 22 is any conventional gas-liquid scrubbing tower designed to contact the hot flue gas with the selected formate, preferably potassium formate in a molten state, at a temperature between the melting point and 400° F., e.g. 350° F. The hot flue gas is scrubbed free, or substantially so, of $SO_2$ in the scrubber 22 by contact with the molten formate. The $SO_2$-free gas is discharged through the stack 24 as clean stack gas. Since the stack gas is at an elevated temperature, its plume does not fall to ground level, but rises and diffuses into the upper atmosphere.

The chemical reaction occurring in the scrubber 22 is that set forth above in Equation 1 for potassium formate $$2KCOOH + 2SO_2 = K_2C_2O_3 + 2CO_2 + H_2O$$

The $CO_2$ produced in the reaction is discharged with the stack gas through stack 24. The reaction is suitably regulated to provide for the conversion of between about 7 to 25% by weight of the formate to the thiosulfate. The solubility of the thiosulfate in the molten formate is about 7%, so that the product leaving the scrubber is in the form of a slurry of the undissolved thiosulfate in the formate solution. It it is desired to recover any part of the thiosulfate for use per se, for instance as a photographic fixing agent, then the slurry may be withdrawn from the scrubber 22 by a pipe 26 to a filter 28 where the thiosulfate may be filtered and discharged through a conduit 30, for further purification, if necessary.

However, in accordance with the present invention, we prefer to regenerate formate from the thiosulfate for reuse in the treatment of flue gas. Accordingly, the $SO_2$-free thiosulfate-formate slurry is pumped around the filter 28 by a by-pass line 31 to a pipe 32 which leads to the first of two reduction zones suitably housed in interconnected vessels designated by the numerals 33 and 34, respectively, and also identified by the legends Reductor No. 1 and Reductor No. 2, respectively. A suitably regulated stream of CO and $H_2$ is fed to each of the Reductors by a main pipe 35 with spur pipelines 36 and 37 leading respectively to vessels 33 and 34. The stream of CO and $H_2$ is blended with recycle gas from line 49. The main pipe 35 is supplied with the reducing gas CO and $H_2$ produced in any suitable manner. The preferred gas composition is one that has a $CO/H_2$ mole ratio of about 1:1. Such a gas may be generated in a partial combustion zone 38 using oxygen from line 39 and natural gas from line 40 blended with a $CO_2$-rich recycle gas from line 48.

Other suitable means of supplying $CO/H_2$ may be used, such as partial combustion of fuel oil, catalytic reforming of natural gas with carbon dioxide-steam mixtures and by steam gasification of coal or coal char.

The partial combustor 38 may be operated at the same or preferably somewhat lower pressure level than the Reductors Nos. 1 and 2. In the latter case, a compressor, not shown, would be installed in line 35 which delivers $CO/H_2$ gas to the regeneration system.

The reaction occurring in the Reductor No. 1 is principally that set forth above in Equation 2, wherein the thiosulfate is converted to carbonate and $H_2S$. The preferred operating conditions for this reduction zone are as follows: a temperature between 500 and 700° F., and a minimum $CO+H_2$ pressure correlated with temperature as shown in Table I. The reaction conducted in Reductor No. 2 is that set forth above in Equation 3b, where the carbonate is converted back to formate. The preferred operating conditions for this second reduction zone are as follows: a temperature between 600 and 700° F. with no catalyst, and a pressure about 1000 p.s.i.g. above the equilibrium pressures given in Table I. The regenerated formate, together with unreacted formate is recycled by pipe 41 to the scrubber 22. The effluent gases produced in Reductor No. 2 are passed to Reductor No. 1 through line 51. The effluent gases from Reductor No. 1 are passed by pipe 42 to an $H_2S$ absorber 44 where the $H_2S$ is selectively removed from the effluent gases. The $H_2S$ is conducted by a pipe 46 to a sulfur recovery plant. The $H_2S$-free effluent gases are recycled in part by pipes 48 and 49 back to the Reductors Nos. 1 and 2. Another part is passed through pipes 48 and 40 to the partial combustion unit 38 where it is blended with natural gas feed. Finally, some of the gas is purged from the system through line 52 to prevent accumulation of impurities.

Description of regeneration in an aqueous formate system

Figure 2:
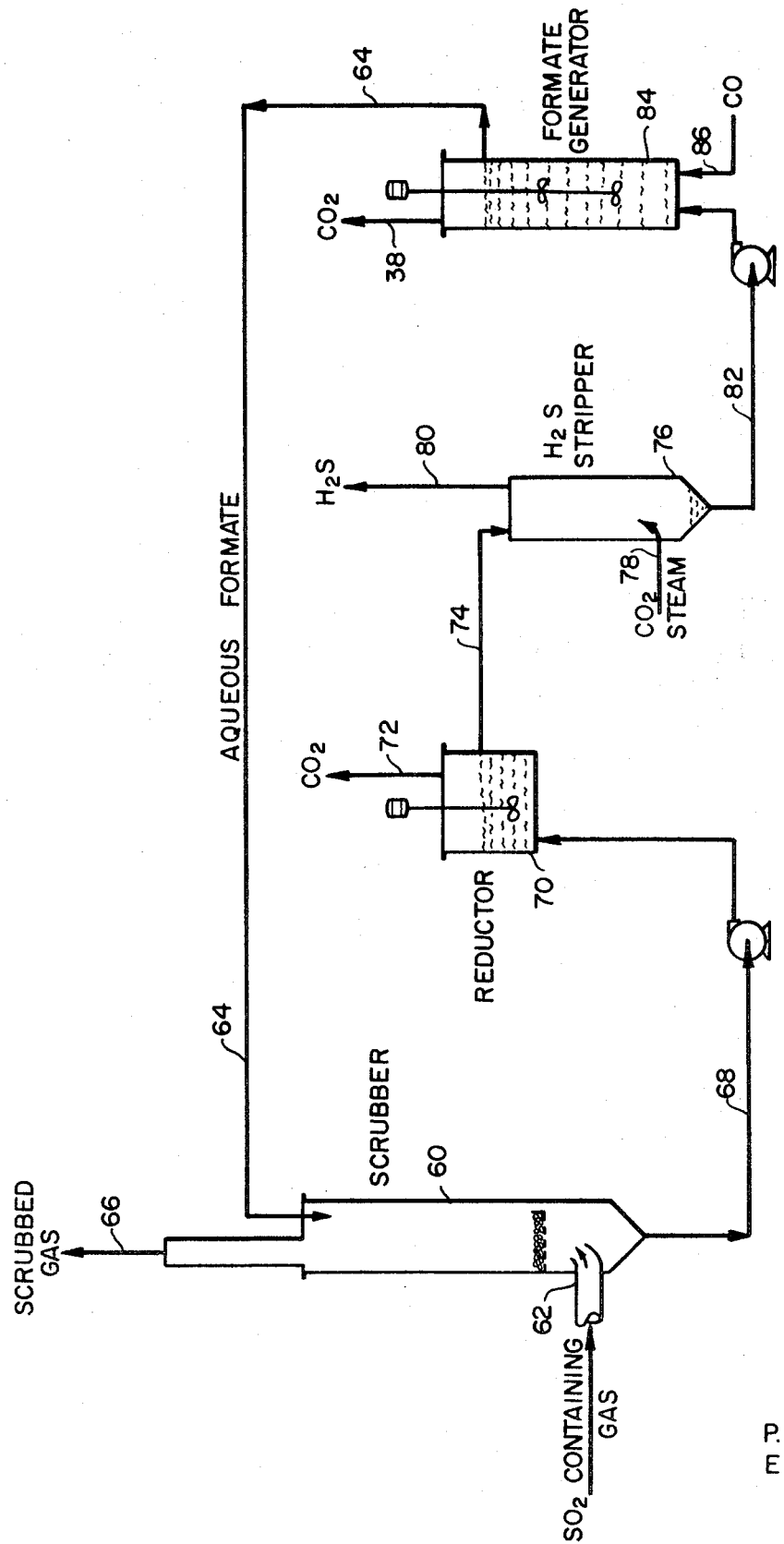
FIG. 2 is a schematic flowsheet of our process for regenerating aqueous formate from thiosulfate.

Referring to FIG. 2 of the drawings, $SO_2$-containing gas is introduced into the bottom of a scrubber 60 through a conduit 62, while concentrated aqueous potassium formate is fed into the top of the scrubber through a conduit 64. The scrubber may be any conventional gas-liquid scrubbing tower designed to contact the $SO_2$-containing gas at elevated temperatures with the selected formate in a liquid state. We prefer to use a jiggling bed of marbles through which the gas and liquid pass in countercurrent flow relationship. The temperature within the scrubber is preferably maintained between 170 and 200° F. when aqueous potassium formate is the absorbing agent. This temperature range has the advantage of eliminating the need for reheat of the scrubbed gases when they are released to the atmosphere. The scrubbed gas, freed of $SO_2$, or substantially so, is discharged through a stack 66 as clean stack gas.

The relative amounts of $SO_2$-containing gas and formate passing through the scrubber are regulated to provide for considerable excess of the formate, so that less than 25% by weight of the formate is converted to the thiosulfate in accordance with the reaction expressed by Equation 1. Accordingly, the major constituents of the effluent liquid stream leaving the bottom of the scrubber through conduit 68 are aqueous potassium formate and potassium thiosulfate. These are pumped to a stirred Reductor vessel 70 wherein the excess formate is used to reduce the thiosulfate to $K_2CO_3$ and, principally, KHS according to the following reaction:

(5) $K_2S_2O_3 + 4KCOOH = 2KHS + 2K_2CO_3 + H_2O + 2CO_2\uparrow$ 

The temperature within the reductor is maintained at about 540° F. while the pressure, which is self-generated, is held at about 500 p.s.i.g. The required reaction time is about 20 minutes. The gaseous product $CO_2$ is discharged from the reductor through a pipe 72.

The products in aqueous solution in the reductor are transferred through a conduit 74 to a so-called $H_2S$ stripper tower 76 through which a stream of $CO_2$ and steam is introduced via a conduit 78 and passed through a series of stacked liquid-gas contacting trays countercurrent to the solution. The $CO_2$ and steam react with the KHS in the aqueous solution at the maintained temperature of 230–270° F. and 10 p.s.i.g. to produce $K_2CO_3$, according to the following reaction:

(6) $2KHS + CO_2 + H_2O = K_2CO_3 + 2H_2S\uparrow$ 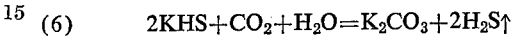

The gaseous $H_2S$ is discharged through a stack 80, while the aqueous solution of $K_2CO_3$ is pumped through a conduit 82 to a stirred Formate Generator vessel 84 where the aqueous $K_2CO_3$ is reconverted to aqueous KCOOH by reaction with CO introduced through a conduit 86, according to the following equation:

(7) $K_2CO_3 + 2CO + H_2O = 2KCOOH + CO_2\uparrow$ 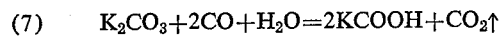

The temperature maintained in the formate generator is about 540° F. and the pressure held at about 1000 p.s.i.g. The residence time is about one hour. The gaseous product $CO_2$ is discharged through a stack 88, while the regenerated aqueous formate is recycled to the scrubber through the conduit 64, after suitable adjustment of its concentration in the aqueous solution.

FIGS. 1 and 2 illustrate preferred embodiments of the present invention as applied to the regeneration process of the present invention as applied to molten and aqueous systems, respectively. In both preferred embodiments, the two essential stages of reduction, namely thiosulfate to $H_2S$ and carbonate to formate, are conducted in separate vessels or zones in order to establish the most favorable conditions for the reactions associated therewith. However, it is to be understood that both reduction stages can be effected in one vessel or zone by simply passing the reducing gas in reactive contact with the mixture of spent formate and thiosulfate from the $SO_2$ scrubber under the general conditions previously recited, that is, 450 to 800° F. and 200 to 3000 p.s.i.g. In such a system, $H_2S$ is continuously separated and discharged from the effluent gas which may then be recycled. The regenerated formate is continuously withdrawn for recycle to the $SO_2$ scrubber.

According to the provisions of the patent statutes, we have explained the principal, preferred construction, and mode of operation of our invention and have illustrated and described what we now consider to represent its best embodiment. However, we desire to have it understood that, within the scope of the appended claims, the invention may be practiced otherwise than as specifically illustrated and described.

We claim:
1. The method of making potassium, sodium, or ammonium formate from the corresponding thiosulfate which comprises
    (a) reacting said thiosulfate with its corresponding formate at a temperature between 450 and 700° F. and under a pressure between 200 and 3000 p.s.i.g., whereby said thiosulfate is reduced to carbonate, and
    (b) reacting said carbonate with a reducing gas containing CO at a temperature between 300 and 800° F. and under a pressure between 200 and 3000 p.s.i.g., whereby said carbonate is reduced to formate.
2. The method according to claim 1 wherein the thiosulfate is aqueous potassium thiosulfate.
3. The method of converting potassium, sodium, or ammonium thiosulfate to the corresponding carbonate which comprises reacting said thiosulfate with the cor- responding formate at a temperature between 450 and 700° F. and a pressure between 200 and 3000 p.s.i.g.

4. The method according to claim 3 wherein the temperature is above 500° F., and the pressure is above 500 p.s.i.g.

References Cited

UNITED STATES PATENTS 1,995,211  3/1935  Leroux _____ 260—542

FOREIGN PATENTS 173,097  12/1921  Great Britain _____ 260—542

LORRAINE A. WEINBERGER, Primary Examiner

V. GARNER, Assistant Examiner

U.S. Cl. X.R.

23—63, 115

PO-1050
(5/69)

UNITED STATES PATENT OFFICE
CERTIFICATE OF CORRECTION

Patent No. 3,584,042                    Dated June 8, 1971

Inventor(s) P. M. Yavorsky and E. Gorin

It is certified that error appears in the above-identified patent and that said Letters Patent are hereby corrected as shown below:

Column 1, lines 26 and 27: Remove the phrase "now Pat. No. 3,475,326."

Column 1, line 56 (Equation 1): End of equation "$=H_2O$" should read $--+H_2O--$ Column 2, line 4 (Equation 2): Middle of equation "$=3M_2CO$" should read $--=3M_2CO_3--$ Column 2, line 60: "tween 200 and 2000" should read --tween 200 and 3000--

Column 5, line 47 (Table V): "36.7% $K_2CO_3$" should read --36.37% $K_2CO_3$--

Column 5, line 72: "Feed fas" should read --Feed gas--

Column 5, line 73: "28.5 s.c.f./hr." should read --29.5 s.c.f./hr.--

Column 6, line 44: Middle portion of equation "$=K_2C_2O_3$" should read $--=K_2S_2O_3--$ Column 6, line 53: "It it is desired" should read --If it is desired--

Column 8, line 51: "principal" should read --principle--.

Signed and sealed this 2nd day of November 1971.

(SEAL)
Attest:

EDWARD M. FLETCHER, JR.             ROBERT GOTTSCHALK
Attesting Officer                    Acting Commissioner of Patents